Aug. 25, 1936.     E. E. HEWITT     2,052,176
FLUID PRESSURE BRAKE
Filed Oct. 13, 1931
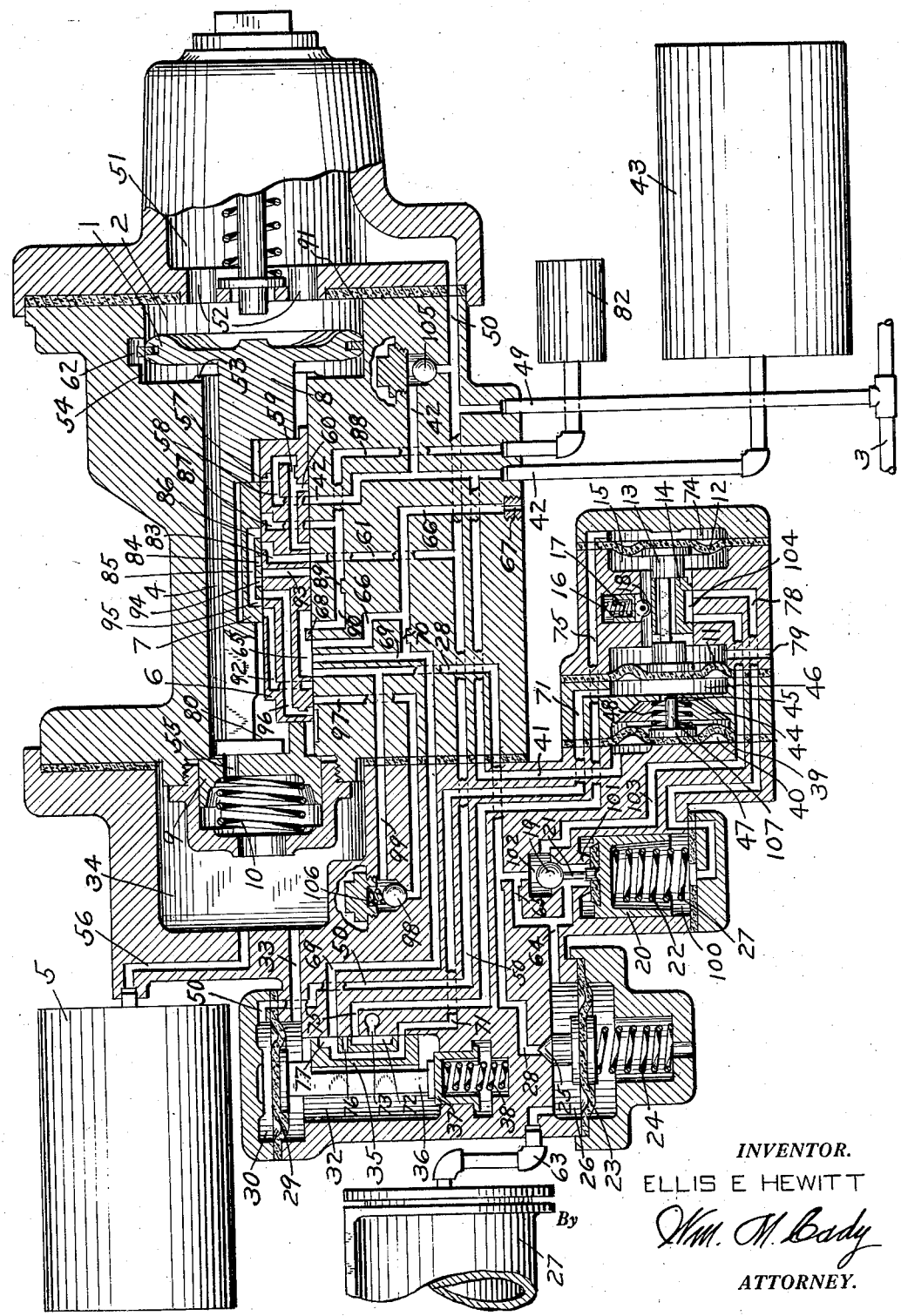
INVENTOR.
ELLIS E HEWITT
By *Wm. M. Cady*
ATTORNEY.

Patented Aug. 25, 1936

2,052,176

UNITED STATES PATENT OFFICE 2,052,176

FLUID PRESSURE BRAKE

Ellis E. Hewitt, Edgewood, Pa., assignor to The Westinghouse Air Brake Company, Wilmerding, Pa., a corporation of Pennsylvania Application October 13, 1931, Serial No. 568,545

7 Claims. (Cl. 303—66)

This invention relates to fluid pressure brakes, and more particularly to an automatic fluid pressure brake system in which the brakes are applied by reducing the brake pipe pressure and released when the brake pipe pressure is increased.

It has heretofore been proposed, as disclosed in the pending application of Clyde C. Farmer, Serial No. 484,979, filed September 29, 1930, to provide means for delaying or retarding the application of brakes on cars in the front portion of a train for a predetermined time, so as to obtain a more nearly synchronous application of the brakes in the front and rear portions of a train, when the brake pipe pressure is reduced. This is particularly desirable in applying the brakes on a long train in order to control the gathering of the train slack so as to prevent a harsh running in of the slack with resultant excessive and damaging shocks.

Under certain conditions of operation, such as in a short train where the amount of slack is less than in a long train and the time required to effect an application of the brakes is also less, or in high speed service, it is not considered necessary to delay the application of brakes in the front portion of the train. Under either of the conditions just mentioned, the brake pipe pressure employed is higher than employed in long trains and in low speed service, and this higher pressure is adapted to operate cut-out means for rendering the brake application delay means ineffective.

In charging the brake pipe on a train, it is customary to first move the usual brake valve device to release position, in which fluid at high pressure is supplied directly from the usual main reservoir to the brake pipe and then after a predetermined time, the brake valve device is moved to running position, in which the pressure of fluid supplied to the brake pipe is governed by the adjustment of the usual feed valve device.

With the brake valve device in the release position, the brake pipe at the front of the train becomes charged to substantially main reservoir pressure and, as a result, the brake equipments in the front of the train may become charged to a pressure sufficient to operate the cut-out means, above mentioned, to render the brake application delay means ineffective, when not desired.

The principal object of my invention is to provide means for obviating the above condition.

In carrying out my invention, I connect the emergency reservoir, the pressure in which controls the brake application delay cut-out means, directly to the brake pipe through the triple valve device in the front end of the train, so that the emergency reservoir pressure is permitted to flow back to the brake pipe and equalize therewith when the brake valve device is turned from release position to running position, in which the brake pipe pressure is governed by the usual feed valve device.

Other objects and advantages will appear in the following more detailed description of my invention.

In the accompanying drawing, the single figure is a diagrammatic view of a brake controlling valve mechanism embodying my invention.

The brake controlling valve mechanism includes a triple valve device comprising a piston 1 having a piston chamber 2 at one side connected to the usual brake pipe 3 and a valve chamber 4 at the opposite side connected to the usual auxiliary reservoir 5. The valve chamber 4 contains a main slide valve 6 and an auxiliary slide valve 7 adapted to be operated by piston 1 through the medium of a piston stem 8.

The triple valve device shown is of the retarded release type, having a retarded release stop member 9 engaging the inner end of the stem 8 and main slide valve 6 and subject to the pressure of a spring 10.

A selector valve device is provided comprising a pair of flexible diaphragms 11 and 12 connected by a stem 13 and adapted to operate a slide valve 14 mounted in an intermediate valve chamber 15. A spring 16 acts on a member 17 carrying a roller 18, so that said roller presses the valve 14 to its seat.

The selector valve device controls the cutting in and cutting out of a brake cylinder pressure inshot valve device comprising a ball valve 19 and a piston 20 having a stem 21 adapted to engage the valve 19. A spring 22 acts on piston 20 and urges the same upwardly so as to unseat the valve 19.

A hold back valve device is provided comprising a flexible diaphragm 23 subject to the pressure of a spring 24 and carrying a valve 25. The chamber 26 at one side of the diaphragm 23 is open to the brake cylinder 27, and the valve 25 controls communication from a passage 28, which leads to the seat of slide valve 6, to chamber 26 and the brake cylinder 27.

For controlling the operation of the selector valve device, a pilot valve device is provided comprising a flexible diaphragm 29 having the chamber 30 at one side connected by a passage 50 to the brake pipe 3, and having the valve chamber 32 at the opposite side connected, through a passage 33 with chamber 34 and the auxiliary reservoir 5. In chamber 32 is mounted a slide valve 35 adapted to be operated by diaphragm 29, through a stem 36. A spring stop 37 engages the lower end of the stem 36 and is subject to the pressure of a spring 38, so that downward movement of stem 36 from the normal position shown in the drawing, is opposed by the spring 38.

Cut-out means are provided for maintaining the selector valve device in the position shown in the drawing for permitting a normal rate of build up of brake cylinder pressure in effecting an application of the brakes. The cut out means comprises a flexible diaphragm 39 having at one side a chamber 40 connected through passage 41 and passage and pipe 42 to the emergency reservoir 43 and having at the other side a chamber 44 open through an aperture 45 in a partition wall to chamber 46 at one side of the selector valve diaphragm 11. A follower plate 47 is pressed into engagement with diaphragm 39 by means of a spring 48 and is provided with a pin 107 projecting into aperture 45.

In operation, when the brake pipe 3 is being initially charged with fluid under pressure, fluid under pressure flows from the brake pipe through pipe and passage 49, passage 50, chamber 51 and ports 52 to the triple valve piston chamber 2.

In the front portion of the train, the rapid rate of increase in brake pipe pressure in piston chamber 2 moves the piston 1 and slide valves 6 and 7 to retarded release position against the pressure of spring 10, and in said position the piston 1 engages a stop rib 53. In the retarded release position, fluid under pressure flows from piston chamber 2 through a feed groove 54 to valve chamber 4, and from thence through port 55 in the retarded release stop member 9, chamber 34, and passage and pipe 56 to the auxiliary reservoir 5, thereby charging said reservoir. Fluid under pressure is supplied directly from the brake pipe passage 50, past a check valve 105 to passage 42 leading to the emergency reservoir 43, and also from passage 50 through passage 61 and cavity 60 in the main slide valve 6 to passage 42. Cavity 60 is open through choke 59, port 58 and port 57 to valve chamber 4, so that in initially charging the brake equipment, fluid under pressure will flow from the brake pipe to valve chamber 4 through the last mentioned communication. When the auxiliary reservoir pressure in valve chamber 4 has been built up to within a predetermined degree of the brake pipe pressure in chamber 2, the spring 10 shifts the piston 1 and slide valves 6 and 7 to the full release position shown in the drawing, in which position the full release charging port 62 is open, through which the final charging of the auxiliary reservoir occurs.

In the rear portion of the train the rate of increase in brake pipe pressure is insufficient to move the piston 1 to retarded release position against the opposing pressure of spring 10, so that piston 1 and slide valves 6 and 7 move only to the full release position shown in the drawing, in which position the auxiliary reservoir 5 is charged through the full release charging port 62. The emergency reservoir is charged past the check valve 105 and the pressure in the auxiliary and emergency reservoirs equalize through pipe and passage 42, ports 58 and 57 in the main slide valve and valve chamber 4.

Diaphragm chamber 30 of the selector pilot valve device being connected to the brake pipe 3 through passages 50 and 49 is charged with fluid at brake pipe pressure, and chamber 32 at the opposite side of diaphragm 29 is charged with fluid at auxiliary reservoir pressure through passage 33.

The brake cylinder 27 is open to the atmosphere through pipe and passage 63, chamber 26, passage 64, choke 65 and past the ball valve 19, through passage 28, cavity 65 in the main slide valve, passage 66 and exhaust choke plug 67 when the triple valve device is in the full release position shown in the drawing. When the triple valve device is in the retarded release position, passage 66 is lapped by the block 68 in the main slide valve, and the brake cylinder is then connected to the atmosphere through passage 69, retarded release choke 70, passage 66 and choke plug 67.

In preparing a train for operation, it is customary to make a yard test of the braking apparatus prior to leaving a terminal. This test, in part, comprises effecting an application and a release of the brakes and is necessary to properly position the selector valve slide valve 14 in accordance with the position of the triple valve device in the train.

In releasing the brakes after an application, fluid at brake cylinder pressure supplied to cavity 65 in the main slide valve 6 flows through passage 69 to the seat of the selector pilot valve slide valve 35.

In the front portion of the train where the rate of increase in brake pipe pressure is rapid, the build up of brake pipe pressure in diaphragm chamber 30 of the pilot valve device deflects said diaphragm downwardly against the opposing auxiliary reservoir pressure in valve chamber 32, and the pressure of spring 38. This deflection of diaphragm 29, which is limited by engagement of the spring stop 37 with the casing, shifts the slide valve 35 to a position in which passage 71 is connected through a cavity 72 to an atmospheric passage 73, thereby venting diaphragm chamber 46 of the selector valve device. In this position of the pilot valve slide valve 35, diaphragm chamber 74 of the selector valve device is connected through passage 75, port 76 and passage 77 in said slide valve to passage 69 which is supplied with fluid under pressure from the brake cylinder. Fluid at brake cylinder pressure thus supplied to chamber 74 of the selector valve device deflects the diaphragm 12 and moves the slide valve 14 toward the left hand. This movement is limited by engagement of diaphragm 11 with the casing and is sufficient to establish communication from passage 78 to chamber 15 which is at all times open to the atmosphere through an atmospheric passage 79.

When the brake cylinder pressure reduces by flow to the atmosphere through the communication hereinbefore described, the stress of the deflected diaphragms 11 and 12 return said diaphragms to their normal position shown in the drawing. This return movement of the diaphragms 11 and 12 to their unstressed position is relative to the slide valve 14, since a predetermined lost motion is provided between the slide valve 14 and the slide valve operating stem 13 for this purpose. Thus, in the front portion of the train the selector slide valve 14 will be positioned so as to connect passage 78 to the atmosphere by way of chamber 15.

When the auxiliary reservoir pressure in valve chamber 32 of the pilot valve device is increased to a predetermined degree, spring 38 shifts the piston 36 and diaphragm 29 to the normal position shown in the drawing, the movement being relative to the slide valve 35.

In the rear portion of the train, the rate of increase in brake pipe pressure in diaphragm chamber 30 of the pilot valve device is insufficient to overcome the increase in auxiliary reservoir pressure in chamber 32 and the pressure of spring 38. As a result, the slide valve 35 remains in the position shown in the drawing in which position diaphragm chamber 74 of the selector valve device is connected to the atmosphere through passage 75, cavity 72 in the pilot slide valve 35 and atmospheric passage 73. Diaphragm chamber 46 of the selector valve device is supplied with fluid under pressure from the brake cylinder exhaust cavity 65 in the triple valve slide valve 6 by way of passage 69, passage 77 in the pilot valve slide valve 35 and passage 71, so that the diaphragm 11 is deflected to position the slide valve 14 in the position shown in the drawing. Then when the pressure in chamber 46 is reduced with the venting of the brake cylinder, the diaphragms 11 and 12 move to their normal unstressed position shown in the drawing, this movement being relative to slide valve 14 for reasons hereinbefore explained.

Now, with the selector slide valve 14 properly positioned in the front and rear portions of the train, if it is desired to effect an application of the brakes, fluid under pressure is gradually vented from the brake pipe 3 and triple valve piston chamber 2 in the usual manner.

When a predetermined light reduction in pressure in piston chamber 2 is thus effected, auxiliary reservoir pressure in valve chamber 4 shifts the piston 1 and auxiliary slide valve 7 toward the right hand relative to the main slide valve 6. This movement temporarily ceases in quick service position in which the end 80 of the piston stem 8 engages the main slide valve 6. In quick service position, communication is established from the brake pipe 3 to a quick service reservoir 82 by way of passage and pipe 49, passages 50 and 61, port 83 in the main slide valve 6, port 84, passage 85 and port 86 in the auxiliary slide valve 7, port 87 in the main slide valve 6 and passage and pipe 88.

The quick service reservoir having been connected to the atmosphere in release position of the main slide valve 6 through passage 88, choke 89, passage 90 and exhaust cavity 65, a rapid quick service reduction in brake pipe pressure is locally effected by the flow of fluid under pressure to said reservoir and this rapid reduction is adapted to serially transmit quick service action through a train of cars in order to hasten the service application of brakes. Fluid under pressure thus vented to the quick service reservoir 82 tends to reduce by flow through the release choke 90 to the atmosphere, but said choke is of such size that no appreciable reduction thus occurs.

When the brake pipe pressure is reduced a predetermined amount greater than required to effect the quick service action just described, the auxiliary reservoir pressure in valve chamber 4 moves the piston 1 and slide valves 6 and 7 to service application position in which said piston engages a gasket 91.

In service position of the slide valves 6 and 7, fluid under pressure is permitted to flow from valve chamber 4 and the connected auxiliary reservoir 5 to the brake cylinder 27 by way of port 92, passage 28, past the unseated ball valve 19, through passage 64, chamber 26, and through passage and pipe 63, so as to effect an application of the brakes.

As hereinbefore described, the selector slide valve 14, in the brake controlling valve devices in the front portion of the train, is in the left hand position, so that chamber 100 at the lower side of the inshot valve piston 20 is open to the atmosphere through passage 78, valve chamber 15 and atmospheric passage 79. As a result, when the pressure of fluid supplied past the ball valve 19 to the brake cylinder and acting on the upper, inner seated area of said valve piston becomes sufficient to overcome spring 22, said valve piston is moved away from seat rib 101, thereby exposing the full area of said valve piston to fluid pressure which promptly moves the valve piston to its lower position and permits ball valve 19 to seat, due to gravity.

The inshot of fluid under pressure past the open valve 19 is adapted to move the usual brake cylinder pistons (not shown) to application position, then the ball valve seats. Further flow of fluid under pressure to the brake cylinder then occurs by flow of fluid under pressure from passage 28 through the choke plug 65 to passage 64. The flow area of choke plug 65 is such as to permit a gradual increase in brake cylinder pressure for applying the brakes at the front of the train at such a rate as to cooperate with the more rapid rate of brake application on the rear portion of the train, as will be hereinafter described, to cause the slack in the train to gather without creating damaging shocks.

When a predetermined brake cylinder pressure is obtained by means of the initial inshot followed by the restricted build up just described, the brake cylinder pressure acting in chamber 26 deflects diaphragm 23 downwardly against the opposing pressure of spring 24. As the diaphragm 23 is thus moved downwardly, valve 25 is unseated and permits fluid under pressure to flow directly from passage 28 to chamber 26 and from thence to the brake cylinder at an increased rate for applying the brakes with the required force to obtain the desired retardation.

In the rear portion of the train, the selector slide valve 14 is positioned as shown in the drawing, as hereinbefore explained, so as to permit fluid under pressure to flow from chamber 102 containing the ball valve 19 through passage 103, cavity 104 in the selector slide valve 14 and passage 78 to chamber 100 at the lower side of the inshot valve piston 20. The fluid pressures acting on the opposite sides of the valve piston thus increase together which permits spring 22 to hold said valve piston in engagement with seat rib 101 and consequently hold the stem 21 in such a position as to maintain the ball valve unseated to permit an unrestricted build up of brake cylinder pressure in the rear portion of the train.

In effecting an application of the brakes, the reduction in brake pipe pressure in diaphragm chamber 30 of the pilot valve device permits auxiliary reservoir pressure in valve chamber 32 to deflect said diaphragm upwardly into engagement with the casing. In the rear portion of the train when the slide valve 35 is in the position shown in the drawing, the deflection of diaphragm 29 and the resultant upward movement of the stem 36 is relative to the slide valve 35, so that said slide valve is not moved. However, in the front portion of the train when the slide valve 35 is in its lower position, the slide valve is moved upwardly to the position shown in the drawing. Then when the auxiliary reservoir pressure reduces by flow to the brake cylinder to a degree substantially equal to the reduced brake pipe pressure, the diaphragm 29 and stem 36 return to their normal position shown in the drawing.

When the auxiliary reservoir pressure in the triple valve chamber 4 is reduced by flow to the brake cylinder to a degree slightly below the reduced brake pipe pressure in piston chamber 2, the piston 1 is operated and moves the auxiliary slide valve 7 inwardly to service lap position. This movement to service lap position occurs relative to the main slide valve 6 and is adapted to lap the service port 92 so as to prevent further flow of fluid under pressure to the brake cylinder.

If less than a full service reduction in brake pipe pressure is initially effected, then if desired a further application of the brakes may be effected by making another reduction in brake pipe pressure.

Upon a further reduction in brake pipe pressure, the piston 1 and auxiliary slide valve 7 move relative to the main slide valve 6 to service position in which the service port 92 is again uncovered to permit further flow of fluid under pressure from the auxiliary reservoir to the brake cylinder, thereby increasing the degree of brake application.

In the traverse of the auxiliary slide valve 7 from service lap position to service position, communication is established from the brake pipe passage 61 to the brake cylinder 27 through port 93 in the main slide valve 6, port 94, passage 85 and port 95 in the auxiliary slide valve 7, port 96 in the main slide valve 6, passage 97, past check valve 98, and through passages 99 and 28. Fluid under pressure is thereby vented from the brake pipe to the brake cylinder to effect a local quick service reduction in brake pipe pressure in order to hasten the operation of the brake controlling valve devices on the train to effect a further application of the brakes.

To effect a release of the brakes after an application, the brake pipe pressure is increased in the usual manner.

The rapid rate of increase in brake pipe pressure in the front portion of the train moves the triple valve piston 1 and slide valves 6 and 7 to retarded release position in which fluid under pressure is supplied to valve chamber 4 and the auxiliary reservoir 5 by flow from piston chamber 2 through the feed groove 54 and at the same time by flow from the charged emergency reservoir 43 through pipe and passage 42, cavity 60 in the main slide valve 6, choke 59, port 58 and port 57. The emergency reservoir 43 is also connected directly to the brake pipe 3 through passage 42, cavity 60 in the main slide valve 6, passages 61 and 50 and passage and pipe 49, so that the pressures in the brake pipe and emergency reservoir equalizes and builds up to the high degree usually initially obtained in the front portion of the train.

When the usual brake valve device (not shown) is turned from the release position to the running position and the brake pipe pressure reduces to that supplied by the usual feed valve device (not shown), fluid under pressure flows back from the emergency reservoir to the brake pipe and remains substantially equal to the brake pipe pressure.

When the pressure in valve chamber 4 is increased to within a predetermined degree of the pressure supplied by the feed valve device to piston chamber 2, spring 10 shifts the piston 1 and slide valves 6 and 7 from retarded release position to full release position shown in the drawing. This movement to full release position does not occur until after the emergency reservoir pressure is reduced to substantially brake pipe pressure, and said movement closes the communication between said reservoir and the brake pipe through cavity 60. However, the emergency reservoir is connected in full release position of the triple valve device to valve chamber 4 and the auxiliary reservoir 2 as hereinbefore described, and equalization of pressures in said reservoirs occurs.

In retarded release position of the triple valve device, fluid under pressure is vented from the brake cylinder to the atmosphere through pipe and passage 63, chamber 26, passage 64, past the ball valve 19, through passage 28, cavity 65 in the slide valve 6, passage 69, choke 70, passage 66 and choke plug 67 and fluid at brake cylinder pressure flows through passage 69 to the seat of the pilot valve slide valve 35.

The pilot valve device is operated by the rapid rate of increase in brake pipe pressure at the head end of the train to supply fluid under pressure from passage 69 to diaphragm chamber 74 of the selector valve device, as hereinbefore described. However, since the selector slide valve 14 was initially properly positioned in the train, the deflection of diaphragms 12 and 11 by fluid under pressure in chamber 74 does not move the slide valve 14 from its left hand position. It will be obvious that the pressure of fluid in diaphragm chamber 74 reduces with brake cylinder pressure and will be atmospheric pressure when the brakes are fully released.

Diaphragm chamber 40 of the hold back cut-out means is in constant communication with the emergency reservoir 43 through passage 41 and passage and pipe 42. The spring 48 acting on the cut-out diaphragm 39 is of such value that the normal emergency reservoir pressure carried in long train operation will not deflect said diaphragm, but the high emergency reservoir pressure obtained in the diaphragm chamber 40 in the front portion of the train in charging is sufficient to deflect said diaphragm and move stem 107 into engagement with the selector valve diaphragm 11. Brake cylinder pressure acting at this time in the selector valve diaphragm chamber 74 plus the pressure of spring 48 more than overbalances the high emergency reservoir pressure in chamber 40. The emergency reservoir pressure reduces when the brake pipe pressure reduces to that normally carried in the brake pipe, as hereinbefore described, and spring 48 then deflects the diaphragm 47 back to its normal position. This occurs before the brake cylinder pressure in chamber 74 is materially reduced, so that the selector valve device at the head end of the train is held in the proper or left hand position in spite of the fact that the emergency reservoir is initially charged to a pressure higher than the normal brake pipe pressure employed in long train operation.

It will be noted from the above that if the high pressure initially obtained in the emergency reservoir were not permitted to reduce with the reduction in brake pipe pressure when the triple valve device is in retarded release position, then such pressure acting on the cut-out diaphragm 39 would deflect said diaphragm and move the selector slide valve 14 to the position shown in the drawing, after the brake cylinder pressure in the selector valve diaphragm chamber 74 becomes reduced to a predetermined low degree.

With the slide valve 14 in its right hand position, an undesired rapid build up of brake cylinder pressure would be obtained at the head end of the train in effecting an application of the brakes.

In the rear portion of the train, the relatively slow rate of increase in brake pipe pressure moves the triple valve piston 1 and slide valves 6 and 7 to full release position shown in the drawing. In this position, fluid under pressure is permitted to flow back from the emergency reservoir 43 through pipe and passage 42 and ports 58 and 57 in the main slide valve 6 to valve chamber 4 and at the same time fluid under pressure is supplied from the brake pipe through the full release charging port 62 to valve chamber 4 and the auxiliary reservoir 5. After equalization of emergency reservoir pressure and auxiliary reservoir pressure, the auxiliary reservoir charges up to brake pipe pressure with fluid supplied through the charging port 62. The emergency reservoir is charged to brake pipe pressure by fluid under pressure supplied past the check valve 105, and equalization of pressures in both of said reservoirs occurs through passage 42, ports 58 and 57 in the main slide valve 6 and valve chamber 4.

In the full release position of the triple valve device fluid under pressure is vented from the brake cylinder to effect a release of the brakes. The pilot valve device operates to supply fluid under pressure from the brake cylinder to the selector valve device, but the selector slide valve 14 being initially properly set in the manner hereinbefore described, its setting is not changed in effecting a release of the brakes.

In effecting a service application of the brakes, if the brake pipe pressure is reduced to a degree below the pressure obtained by equalization of the auxiliary reservoir into the brake cylinder, then the auxiliary reservoir pressure in chamber 4 maintains the piston 1 in service position in engagement with gasket 91. In releasing the brakes after such an application, if the rate of increase in brake pipe pressure is slow as in the rear portion of the train, the piston 1 is gradually moved from the service position toward release position and in so moving passes through the quick service position before the service lap position is reached.

In the quick service position, fluid under pressure is supplied from the brake pipe through passages 50 and 61, port 93 in the main slide valve 6, port 94, passage 85 and port 95 in the auxiliary slide valve, port 96 in the main slide valve and through passage 97 to the lower side of the valve 98. The valve 98 is however pressed into engagement with its seat by means of a spring 106 which is adapted to prevent flow of fluid from passage 97 to passage 99 leading to the brake cylinder passage 28, which at this time is open through the service port 92 to the valve chamber 4 and auxiliary reservoir 5. By thus preventing flow of fluid under pressure from the brake pipe to valve chamber 4, it is possible to increase the pressure in piston chamber 2 over the pressure in valve chamber 4 so as to effect movement of the triple valve parts to the release position. If the spring 106 were not employed on check valve 98, it might, under certain conditions, be difficult to obtain a release of the breaks.

The spring 106 acting on the check valve 98 is only of sufficient value to ensure obtaining the required pressure differential on the triple valve piston 1 to move it to release position, and its pressure does not interfere with the quick service action obtained when the triple valve device is moved from service lap to service position.

In high speed service or in operating short trains where it is not considered necessary to retard the build up of brake cylinder pressure on cars at the head end of the train, the standard brake pipe pressure employed is higher than employed in long train operation. The emergency reservoir 43, auxiliary reservoir 5 and other parts of the equipment thus become charged to the higher brake pipe pressure in initially charging the train and in effecting a release of the brakes after an application, and the high emergency reservoir pressure acting in chamber 40 is adapted to deflect the cut out diaphragm 39 toward the right hand to cut out position against the opposing pressure of spring 48. The deflection of diaphragm 39 moves pin 107 into engagement with diaphragm 11 and deflects said diaphragm toward the right hand sufficient for moving the slide valve 14 to the position shown in the drawing in which position unretarded application of the brakes is permitted to be effected in the manner hereinbefore described.

It will here be noted that the hold back cut out means, just described, are not undesirably operated however, in operating a long train employing standard brake pipe pressure, even though the emergency reservoir is overcharged to a higher pressure than normally carried in the brake pipe, due to the fact that the initial high emergency reservoir pressure obtained in charging the brake pipe is permitted to flow back to the brake pipe when the brake pipe pressure reduces to that normally carried, as hereinbefore fully described.

The subject matter relating to the feature of venting fluid under pressure from a reservoir to the brake pipe after an application of the brakes in order to facilitate the release of the brakes is claimed broadly in Clyde C. Farmer's pending application Serial No. 612,465, filed May 20, 1932, which is in part a continuation of his application, Serial No. 487,988, filed October 11, 1930, and the subject matter relating to the controlled build up of brake cylinder pressure in effecting an application of the brakes is broadly claimed in the Farmer application, Serial No. 612,465.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake, the combination with a brake pipe, a brake cylinder, an auxiliary reservoir, and an emergency reservoir, of a triple valve device operative upon a reduction in brake pipe pressure to supply fluid under pressure from said auxiliary reservoir to said brake cylinder to effect an application of the brakes, and operative upon a rapid rate of increase in brake pipe pressure to vent fluid under pressure from said emergency reservoir to said brake pipe and at the same time to supply fluid under pressure from said brake pipe to said auxiliary reservoir, and operative upon a slower rate of increase in brake pipe pressure to vent fluid under pressure from said emergency reservoir to said auxiliary reservoir.

2. In a fluid pressure brake, the combination with a brake pipe, a brake cylinder, an auxiliary reservoir, and an emergency reservoir, of a triple valve device operative upon a reduction in brake pipe pressure to supply fluid under pressure from said auxiliary reservoir to said brake cylinder to effect an application of the brakes, and operative upon a rapid rate of increase in brake pipe pressure to vent fluid under pressure from said emergency reservoir to said brake pipe, and upon a slower rate of increase in brake pipe pressure to vent fluid under pressure from said emergency reservoir to said auxiliary reservoir, said triple valve device being operative irrespective of the rate of increase in brake pipe pressure to supply fluid under pressure from said brake pipe to said auxiliary reservoir.

3. In a fluid pressure brake, the combination with a brake pipe, a brake cylinder, an auxiliary reservoir, and an emergency reservoir, of a triple valve device operative upon a reduction in brake pipe pressure to supply fluid under pressure from said auxiliary reservoir to said brake cylinder to effect an application of the brakes, and operative upon a rapid rate of increase in brake pipe pressure to vent fluid under pressure from said emergency reservoir to said brake pipe at an unrestricted rate and to said auxiliary reservoir at a restricted rate, and operative upon a slower rate of increase in brake pipe pressure to vent fluid under pressure from said emergency reservoir only to said auxiliary reservoir at a faster rate than when the rate of increase in brake pipe pressure is rapid.

4. In a fluid pressure brake, the combination with a brake pipe, a brake cylinder, an auxiliary reservoir, an emergency reservoir having communication with said brake pipe through which fluid under pressure is supplied from said brake pipe to said emergency reservoir, and a check valve interposed in said communication, of a triple valve device operative upon a reduction in brake pipe pressure to supply fluid under pressure from said auxiliary reservoir to said brake cylinder to effect an application of the brakes and operative upon a rapid rate of increase in brake pipe pressure to supply fluid under pressure from said brake pipe to said auxiliary reservoir and to open a by-pass around said check valve, and means for operating said triple valve device for closing said by-pass upon substantial equalization of pressures in said auxiliary reservoir and brake pipe.

5. In a fluid pressure brake, the combination with a brake pipe, a brake cylinder, an auxiliary reservoir, an emergency reservoir having communication with said brake pipe through which fluid under pressure is supplied from said brake pipe to said emergency reservoir, and a check valve interposed in said communication, of a triple valve device comprising a casing having a passage connected to the brake pipe and operative upon a reduction in brake pipe pressure to vent fluid under pressure from the brake pipe through said passage for effecting a quick service reduction in brake pipe pressure and also operative upon a reduction in brake pipe pressure to supply fluid under pressure from said auxiliary reservoir to said brake cylinder for effecting an application of the brakes, said triple valve device being operative upon an increase in brake pipe pressure to vent fluid under pressure from said emergency reservoir through said passage to the brake pipe and to vent fluid under pressure from the brake cylinder to effect a release of the brakes.

6. In a fluid pressure brake, the combination with a brake pipe, a brake cylinder, and an auxiliary reservoir, of a triple valve device movable upon a reduction in brake pipe pressure to a quick service position for venting fluid under pressure from said brake pipe to said brake cylinder and from said auxiliary reservoir to said brake cylinder, and movable upon a further reduction in brake pipe pressure to service position for closing the communication from the brake pipe to the brake cylinder, and means operative in quick service position of said triple valve device upon an increase in brake pipe pressure and after equalization of pressures in the auxiliary reservoir and brake cylinder for causing the brake pipe pressure to increase a predetermined degree above auxiliary reservoir pressure for moving the triple valve device to release position.

7. In a fluid pressure brake, the combination with a brake pipe, a brake cylinder, an auxiliary reservoir, and an emergency reservoir, of a triple valve device comprising a slide valve, and a piston operative upon a reduction in brake pipe pressure to position said slide valve to supply fluid under pressure from said auxiliary reservoir to said brake cylinder to effect an application of the brakes, and operative upon an increase in brake pipe pressure to position said slide valve to vent fluid under pressure from said emergency reservoir to said brake pipe, said piston being operative at the same time as fluid under pressure is vented from the emergency reservoir to supply fluid under pressure from said brake pipe to said auxiliary reservoir.

ELLIS E. HEWITT.